United States Patent [19]

Maggio

[11] Patent Number: 4,753,195
[45] Date of Patent: Jun. 28, 1988

[54] "NON-SPOOKING" COMBINATION BIRD FEEDER AND SHELTER

[76] Inventor: Louis Maggio, 134 Hall Hill Rd., Somers, Conn. 06071

[21] Appl. No.: 944,944

[22] Filed: Dec. 22, 1986

[51] Int. Cl.4 ............................................. A01K 5/00
[52] U.S. Cl. .................................................. 119/52 R
[58] Field of Search ...................... 119/51 R, 52 R, 23

[56] References Cited

U.S. PATENT DOCUMENTS

| 2,230,058 | 1/1941 | Hornung | 119/52 R |
| 2,430,541 | 11/1947 | Thatcher | 119/51 R |
| 2,918,901 | 12/1959 | Poulsen | 119/51 R |
| 3,094,973 | 6/1963 | Devall | 119/52 R |
| 3,104,649 | 9/1963 | Slaven | 119/52 R |
| 3,157,159 | 11/1964 | Koistinen et al. | 119/52 R |
| 3,291,100 | 12/1966 | Negaard | 119/51 R |
| 3,730,141 | 5/1973 | Manning et al. | 119/52 R |
| 3,927,645 | 12/1975 | Varner | 119/51 R |
| 4,361,116 | 11/1982 | Kilham | 119/51 R |

Primary Examiner—John J. Wilson
Assistant Examiner—R. Thomas Price
Attorney, Agent, or Firm—Peter R. Bahn

[57] ABSTRACT

A combination bird feeder and shelter lined with one way mirrored film. Two totally enclosed seed bins angle downward to the feeder/shelter floor where birds may perch or platform feed. The feeder is either removably mounted on a window surface with suction cups and keyhole slots in the rear of the feeder or a bracket is provided to mount the feeder from underneath. A removable top with seed fill ports for routine filling is employed allowing access to the interior of the seed bins for periodic cleaning.

3 Claims, 2 Drawing Sheets

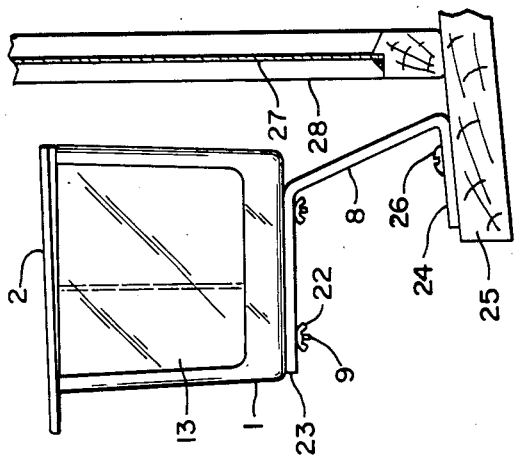
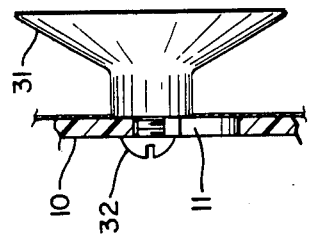
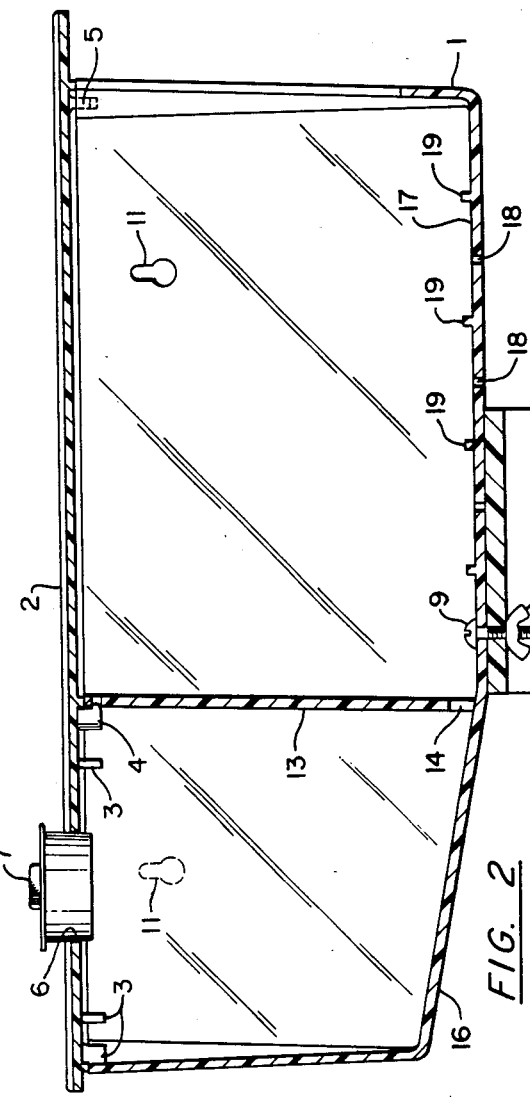
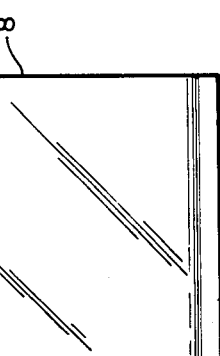
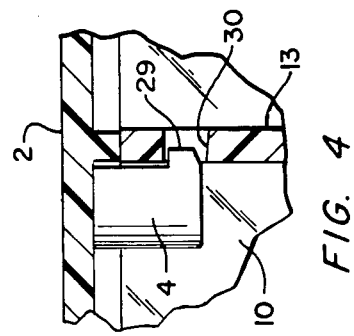

"NON-SPOOKING" COMBINATION BIRD FEEDER AND SHELTER

BACKGROUND OF THE INVENTION

This invention relates to an improved feeder that utilizes a mirrored film application. In particular, this feeder brings the concepts of close observation of wild birds by direct mounting on the window combined with the added feature of providing a shelter as employed by conventional backyard feeders.

For years man's natural curiosity has led him to design many window mount feeders so that birds may be viewed at a close a distance as possible without the use of visual aids. Because these feeders have been made of clear materials and open to the elements, the birds could observe their human audience as well as being offered soggy contaminated seed. These factors have led to an underutilization of the full potential of the window feeding concept.

Accordingly, it is desirable to provide a bird feeder whereby birds cannot see themselves being observed. This invention provides a novel bird feeder and shelter combination utilizing the concept of mirrored film that mounts either directly on the windowpane or windowsill. Added security and safety has been provided by totally enclosing the seed feeding bins so that food is kept dry, as well as providing a shelter enclosure shielding birds and seed from the elements. This is accomplished without hampering the birds' visualization of other approaching birds or their ability to take flight when desired. When bracket mounted, the user need not leave his home to fill and clean the feeder. A removable top allows access to the interior of the seed bins for periodic cleaning while routine filling is accomplished through feed holes on the top of the bins. This added feature enables the feeder to be used by the elderly, handicapped, and those in multi-story urban locations where conventional feeders cannot. It has been found, therefore, that this invention has maximized the full potential and concept of observing birds at close range during feeding.

SUMMARY OF THE INVENTION

This invention is a particular bird feeder whose lightweight, rugged construction makes it especially adaptable for window mounting while remaining easy to clean and providing an attractive and ornamental appearance. This combination of elements will demonstrate its advantages over prior art.

More particularly, this feeder provides a secure environment for birds to feed due to its shelter feature and the inability of birds to view humans observing them by a mirrored film application. In addition, alternative mounting directly on the windowpane and windowsill offer easy access for filling and cleaning and continued use of the window itself for ventilation. As an added benefit, one can now enjoy listening to communications between the same or different species while under direct observation.

Safety considerations for the birds have been incorporated into the design. Totally enclosed seed bins that angle downward to the feeding area insure that the seed will not get wet and rot. Drain holes in the feeder floor and a roof with an overhang and $\frac{1}{8}"-\frac{1}{4}"$ pitch from back to front provide additional precautions against wet seed and icing of the floor or seed during the cold months. Raised ridges on the feeder floor provide a foothold for those birds that fly directly into the feeder to prevent sliding into the seed bins. Enough room has been allowed for even the large birds to exit the feeder/shelter without harming themselves. The feeder's shelter feature allows for protection from the elements. Birds feel added security as the approach of other birds or enemies can be witnessed. Placement directly on the house offers safety from cats and squirrels who find it difficult to sneak up or land on the feeder.

Gravity fed dual seed feeding bins offer the ability to tailor the birds' diets with different seed mixtures as well as aiding in seed conservation. Solid food such as suet may be placed directly in the feeding area and not affect seed flow or be pushed off. The raised ridges surrounding the feeder floor allow the birds to perch and feed while also preventing waste of seed from spillage. Birds can also enter the feeder directly and platform feed. The feeder is easily filled through the fill holes provided on the top by either removing the entire feeder from the suction cups via the keyhole slots in the rear of the feeder or from inside one's home directly through the window when bracket mounted to the windowsill. Mounting is accomplished via direct placement on the window utilizing suction cups or from underneath the feeder attached to a windowsill with a $\frac{1}{4}"$ clear molded acrylic bracket. Preadjusted screws are affixed in the suction cups to maintain the pull of the downward force from the feeder perpendicular to the axis thereof and so no adjustment will be necessary to engage the feeder in the keyhole slots. A third spacer suction cup with no screws is provided which, when placed behind the feeder, allows for an unobstructed flow of precipitation behind the feeder.

Alternatively, the molded bracket, when mounted from underneath the feeder floor and securely attached to the windowsill, enables one to fill and clean the feeder from inside the home while also allowing for continued use of the window for ventilation in warm weather. As an added benefit of this feature, one can enjoy the sounds as well as the sights of birding activities. This feeder lends itself to urban, multi-story dwellings where conventional feeders would be impossible or impractical to use. A detachable top makes the interior of the seed bins accessible for periodic cleaning.

While there is shown and described specific structures in the invention it will be obvious to those skilled in this art that various modifications and rearrangements may be made without diverging from the underlying inventive concept.

It is therefore an object of this invention to provide a secure window mount feeder to permit close range observation of birds during feeding.

Another object of this invention is the application of a mirrored film to prevent the birds from observing their human audience.

Another object of this invention is to provide a bird feeder that may be mounted on the windowsill to provide the elderly, handicapped, urban, and multi-story dwellers the ability to feed birds.

Another object of this invention is to provide for continued use of the window for ventilation with the added advantage of listening to bird cells and communications.

A further object of this invention is to provide a bird feeder that is mounted with suction cups directly on the window itself.

A still further object of this invention is to provide preadjusted affixed suction cups to prevent accidental dislodging of the cups and feeder.

Another object of this invention is to provide a shelter from the elements and enhance the security of birds when feeding.

Another object of this invention is to provide for seed conservation and seed and bird safety with totally enclosed seed bins, raised edges, anti-skid ribs, drainage holes, and a pitched roof.

Another object of this invention is to provide for perch or platform feeding.

A further object of this invention is to provide easy access for cleaning and refilling either by removing the feeder via keyhole slots when mounted with suction cups or directly from inside one's home when bracket mounted.

A still further object of this invention is a removable top with fill holes for routine filling and for access to the interior of the seed bins for cleaning.

Other objects and features of this invention will become apparent when described in connection with the accompanying illustrative drawings.

DETAILED DESCRIPTION OF THE INVENTION

The present invention is shown in detail in the accompanying figures.

FIG. 2 shows a cut-away front-facing side view of the shelter/feeder.

FIG. 3 shows a side-facing side view of the shelter/feeder mounted on a window sill.

FIG. 4 shows a side view of a male/female locking means for attachment of the shelter roof to the shelter body.

FIG. 5 shows a top view of a friction lock means for attachment of the shelter roof to the shelter body.

FIG. 6 shows a side view of a suction cup means for attachment of the feeder directly to a window pane.

Figure 1:
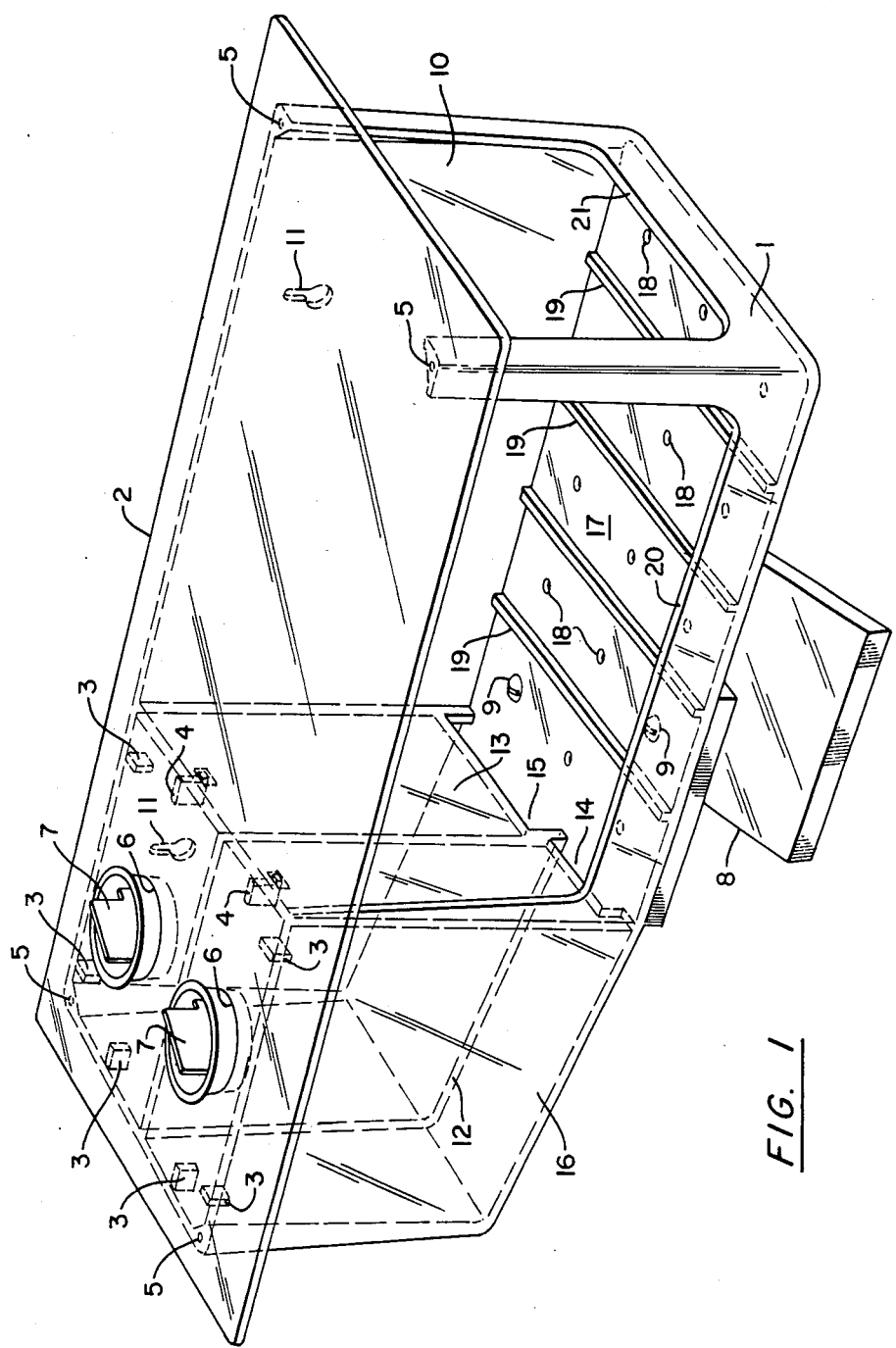
FIG. 1 shows a top perspective view of the complete shelter/feeder.

Referring more particularly to FIG. 1, it is seen that the feeder has a molded clear acrylic plastic body 1 to which a roof 2 is attached and held in place by six friction locks 3, two male/female locks 4, and four pins 5 which insert into four wells located in the corners of body 1.

The roof 2, which is made of clear acrylic plastic, has two feed bin holes 6 into which are inserted pull-tab plugs 7. Pull-tab plugs may be such as those which are described in U.S. Pat. No. 3,148,798 by Brown.

The roof 2 of the shelter has a 1 degree downward slant towards the front of the feeder to direct rain water in that direction away from a house.

The feeder is attached to a window sill by a clear acrylic plastic bracket 8 to which the shelter body 1 is firmly attached with threaded bolts 9.

The body of the shelter 1 has several features for the accommodation of birds which now will be described. The entire back side 10 of the body is covered with a one-way mirrored surface with the mirrored side facing in toward the interior of the shelter. The one-way mirror constitutes a non-spooking feature of the shelter in that when the shelter is mounted on a window sill or on a window pane, human observers may view the birds in close proximity. When birds inside the shelter look towards the windowwall, all they see are reflections of themselves.

The back side 10 of the shelter body has two key-shaped holes 11 for alternatively mounting the shelter directly to a window pane via suction cups, rather than via the window sill mounting bracket 8.

The feeder portion of the shelter/feeder consists of two compartments shown to the left of FIG. 1. The compartments, of different volumes, are bounded in part by a clear acrylic plastic panel 12 parallel to the front and back sides of the body 1 and also another clear acrylic plastic panel 13 perpendicular to the panel 12.

The panel 13 has two different sized slot openings, 14 and 15 which are 5/16" and 7/16" respectively, just above the floor area of the shelter/feeder. The different volumes and different slot openings of the two feeder bins are designed to accommodate the use of two different size seeds such as thistle seeds and sunflower seeds. Thus, the smaller thistle seeds would be placed in the front bin shown in FIG. 1 and the larger sunflower seeds would be placed in the back bin shown in FIG. 1.

The feed bins are bounded on the bottom by a floor area 16 which slants toward the shelter interior at a 10 degree angle. The slant of the floor area thus provides a gravity feed means for introducing seeds from the feed bins into the main feeding area of the shelter at a measured rate.

The shelter body has a main platform area 17 where the birds may feed and take shelter from rain or snow. The platform area 17 is perforated by numerous holes 18 for drainage of any water that does get into the interior of the shelter/feeder. It is through two of these holes that the bolts 9 are inserted to secure the body of the shelter to the window sill mounting bracket 8.

The main platform area 17 is provided with anti-skid ridges 19. The ridges 19 prevent seeds from spreading too far from the feed bin slot openings 14 and 15. The ridges 19 also help prevent birds flying into the shelter at high speed from skidding and crashing into the panel 13.

The body of the shelter possesses two side ridges, 20 and 21 respectively, at its perimeter. The ridges 20 and 21 keep seeds from falling out of the shelter and provide convenient perches from which birds may feed on seeds that are deposited on the platform area of the shelter/feeder. Where ridges 20 and 21 meet near the front bottom corner of the platform area, they slope upward to form a vertical support column for supporting the front right and the back right corner of the roof.

In FIG. 2 is shown a cut-away front-facing side view of the shelter/feeder with most of the components previously mentioned in connection with FIG. 1. Thus, FIG. 2 shows the body 1, the roof 2, the friction locks 3, a male/female lock 4, and a pin 5 inserted into a well at the corner of the body 1. The pull-tab plug 7 is shown inserted into a feed bin hole 6. The one-way mirrored back side 10 is shown perforated by the two key-shaped holes 11 for alternate window pane mounting via suction cups.

The window sill mounting bracket 8 is shown secured to the body 1 with a threaded bolt 9 and a wing nut 22. The panel 13 is shown with the front slot opening 14 which allows travel of seeds from the front feed bin onto the main platform area. Also shown is the main platform area 17 which is perforated by the drainage holes 18 and has the anti-skid ridges 19.

In FIG. 3 is shown a side-facing side view of the feeder/shelter mounted to a window sill. Shown are the roof 2 of the shelter, with its 1 degree slant, attached to the body 1 of the shelter. The body 1 of the shelter is secured to the mounting bracket 8 with two threaded bolts 9 and two wind nuts 22. The top region 23 of the bracket 8 is maintained in a level horizontal orientation with respect to the ground. The bottom region 24 of the bracket 8 has a 5 degree angle with respect to the top region 23. The reason for this 5 degree angle is that all window sills have a uniform 5 degree slant with respect to a true horizontal relative to the ground.

The bracket 8 is secured to a window sill 25 by a screw 26 which inserts through a hole in the bottom region 24 of the bracket and is screwed into the window sill.

Mounting of the shelter with the bracket to a window sill allows the observation of birds and servicing of the shelter without obstruction of the nearby window pane 27 or window frame 28. Thus window pane 27 and frame 28 may be opened and closed at least in a vertical direction as if there were no shelter/feeder present.

In FIG. 4 is shown a detailed side view of the male/female lock 4 referred to in FIG. 1 and FIG. 2. The lock has a protuberance 29 which snaps into a well 30 located in the panel 13, thus helping to secure the roof 2 of the shelter to the body 1 of the shelter.

In FIG. 5 is shown a top view of a pin 5 inserted into a well looking down through the roof of the shelter. The pin 5 helps hold the roof onto the body 1 of the shelter. All of the friction locks, the male/female locks, and the pins are essentially small armatures that project downward from the roof of the shelter and which snap into place when the roof is attached to the body, but which also allow the roof to be detached from the body for servicing of the shelter from inside an open window.

In FIG. 6 is shown an alternate means of attaching the shelter/feeder directly to a window pane via suction cups 31. A suction cup 31 is secured to the back side 10 of the shelter body with a screw 32 that extends through the key-shaped hole 11 in the back side 10 of the body. The concave surface of the suction cup 31 is wetted and then pressed firmly against a window pane whereupon the cup is held against the window pane by a partial vacuum created in the volume bounded by the window pane and the concave surface 33.

Use of the alternate means of mounting of the shelter via suction cups, in contrast to the use of a bracket, allows a window to be at least partially opened when the window is of the type that swings outward from a house.

What is claimed:

1. A feeder for birds designed to be attached to a window pane or mounted to a windowsill to allow for close range observation of birds comprising, in combination:

a. a body member comprised of a horizontally disposed rectangular bottom floor which runs longitudinally to a point of angle where said bottom floor slopes 30 degrees vertically upward and connects perpendicularly to a side wall, a vertical back panel finished with a one way mirrored film, a rectangular vertical wall running along said point of angle from said back panel to a front edge of said bottom floor, a front vertical wall positioned parallel to said back panel extending from said point of angle to said side wall, a vertical wall positioned parallel to said back panel which extends from said point of angle and connects perpendicularly to said side wall separating said body member into feed bin and feeder areas;
   b. a completely detachable roof section comprised of a substantially horizontal rectangular unit that joins flush with said back mirrored panel, said roof section supported at a front right corner by a vertical support column from said bottom floor, said roof section projects outwardly one inch beyond the dimensions of said bottom floor;
   c. support means for placement of the feeder closely adjacent to a vertical supporting surface parallel with vertical feeder walls;
   d. the separating panel divides the feed bin into front and back feed bin areas of differing size;
   e. the feed bin area includes a back feed bin area with an opening along said point of angle raised 7/16" above said bottom floor for large feed dispensing and a front feed bin area with an opening along said point of angle raised 5/16" above said bottom floor for small feed dispensing;
   f. male and female friction locks evenly spaced on an upper periphery of said feed bin areas and a front and back right support columns to accommodate said detachable roof section.

2. A feeder as in claim 1 possessing:

a. said feeder body is shorter in height along the front edge and taller in height in back so that when said roof section is attached to said body, the said roof pitches approximately ¾" downward from the said back panel to the said front panel;
   b. said roof section overhangs one inch on all sides of said feeder body except for a roof edge that is flush with said back panel;
   c. two feed fill holes 1½" in diameter centered directly above each feed bin area.

3. A feeder as in claim 2 where said feed fill holes are fitted with two plastic caps that vary in diameter to fit snugly into said feed fill holes, said caps possessing tabs for removal therefrom.

* * * * *